May 21, 1963 NOBORU TAKAHASHI ETAL 3,090,864
ELECTRON MICROSCOPE
Filed June 15, 1961 2 Sheets-Sheet 1

INVENTORS.
NOBORU TAKAHASHI &
KANICHI ASHINUMA,
BY Richards & Geier
ATTORNEYS

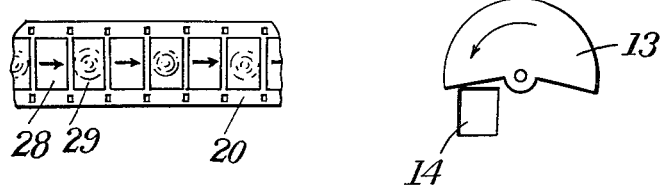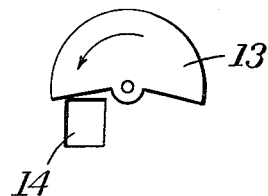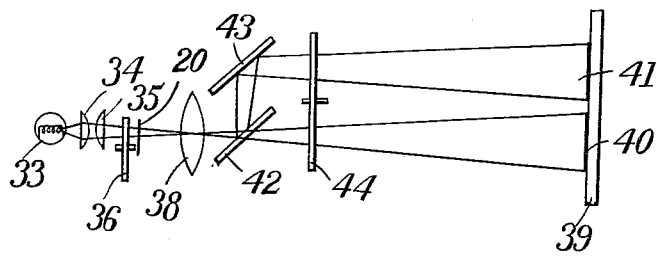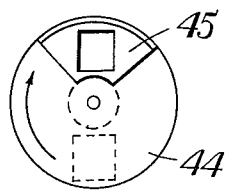

United States Patent Office 3,090,864
Patented May 21, 1963

3,090,864
ELECTRON MICROSCOPE
Noboru Takahashi, Kofu-shi, Yamanashi-ken, and Kan-ichi Ashinuma, Tokyo, Japan, assignors to Kabushiki-kaisha Nihondenshi Kogaku Kenkyusho, Tokyo, Japan, a corporation of Japan
Filed June 15, 1961, Ser. No. 117,382
Claims priority, application Japan June 18, 1960
4 Claims. (Cl. 250—49.5)

This invention relates to an electron microscope or the like and more particularly to such a device wherein an electron microscopic image and an electron diffraction pattern in the same field may be observed or photographed alternately. It has been well known that in a heretofore known electron microscope a microscopic image and a diffraction pattern can be observed separately by operating an intermediate lens. In this conventional method, however, the microscopic image and the diffraction pattern are focused into images separately and then observed, hence it has been impossible to observe successively the microscopic image and the diffraction pattern of the same observation field of a specimen relative to each other, furthermore observation of dynamic changes of the microscopic image and the diffraction pattern could not have been observed consecutively.

Therefore, one object of this invention is to provide an electron microscope in which a microscopic image and a diffraction pattern of a specimen in the same field are focused into images alternately and successively and then they are consecutively observed directly or photographed on a film by which comparative observation of the two may be made possible.

Another object of this invention is to provide an electron microscope in which an electron microscopic image and an electron diffraction pattern of a specimen are focused into images alternately and successively and then they are photographed successively on a film by which conditions of dynamic changes of the specimen may be observed in point of the form and the molecular construction.

And still another object of this invention is to provide an electron microscope which is simple in construction and easy in operation and wherein an electron microscopic image and a diffraction pattern of a specimen in the same field are focused into images alternately and they may be filmed.

A further object of this invention is to provide a device wherein an electron microscopic image and a diffraction pattern of a specimen in the same field may be projected on the same screen from a film on which these two images are shot successively one after the other.

Other objects, features and advantages of this invention will be fully apparent from the following description taken in connection with the accompanying drawings in which, FIGURE 1 illustrates arrangements of main parts of an electron microscope according to this invention and shows paths of electron beams illustrating how an electron microscopic image and an electron diffraction pattern are focused, the vacuumed microscopic column itself being omitted for the sake of simplicity;

FIGURE 4 is a schematic front view of a shutter mechanism of a photographic apparatus disposed within a microscopic column.

FIGURE 5 is a front view of a film on which electron microscopic images and electron diffraction patterns are photographed alternately;

FIGURE 6 illustrates diagrammatically arrangement of a projection device for projecting the patterns and images of the film shown in FIG. 5; and FIGURE 7 is a front view of a shutter employed in the projection device shown in FIG. 6.

Figure 1:
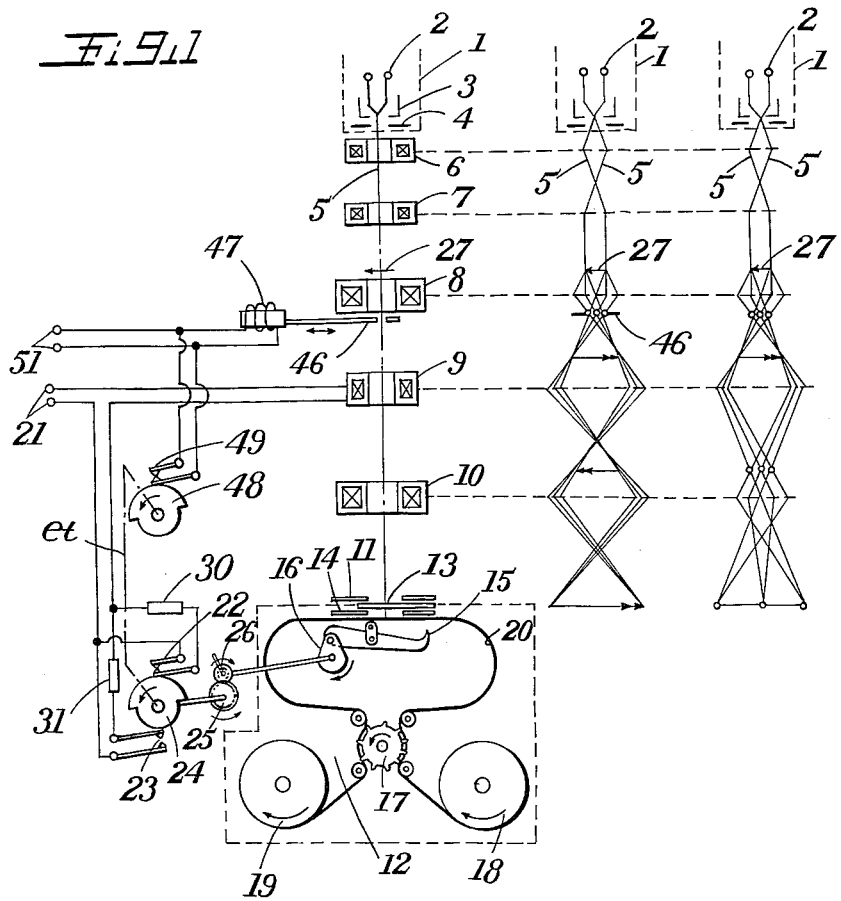

In FIG. 1 an electron gun is composed of a filament 2, a control electrode 3 and an anode 4. By impressing a proper voltage to these electrodes as known by those skilled in the art, an electron beam 5 is emitted from the filament 2. With converging lenses 6 and 7, an objective lens 8, an intermediate lens 9 and a projector lens 10 consisting of a group of coils disposed in the advance direction of the electron beam 5 emitted from the electron gun, the electron beam 5 is accelerated to be focused into an image on a fluorescent screen 11 provided with an aperture. The above mentioned respective parts are of course arranged within an electron microscopic column which is a vacuum container but such body is not illustrated for the sake of simplicity. In front of the fluorescent screen 11, namely at the lower part of the column is arranged a photographic apparatus which is composed of a shutter 13, an aperture 14, a film transferring pawl 15 to be meshed with perforations of a film 20, a pawl driving crank 16 pivoted onto one end of the pawl, a film driving sprocket wheel 17, a film supply spool 18 and a take-up spool 19. Since these film driving means are the same as the mechanism of a heretofore known projector, their film transferring operations are apparent to those skilled in the art, therefore we omit their further detailed explanations. All the devices are disposed in a vacuum container as above described. But such a construction that the photographic apparatus is placed outside the vacuum and a focused image on the fluorescent screen may be photographed may also be effected. The coil of the intermediate lens is connected to a power source 21 through a pair of parallel connected switches 22 and 23 to be controlled by a cam 24. The cam 24 is ganged with the pawl driving crank 16 through meshed gears 25 and 26 having the gear ratio 1 to 2 and so made as to repeat opening and closing of the switches 22 and 23, the opening and closing operation being alternately changed in every frame of photographing. A controlling device 47 of an objective iris 46 is provided, which is composed of a plunger and a solenoid coil, for instance, which is connected to the power source 51 through a switch 49. The switch 49 is controlled by a cam 48 which is ganged with the cam 24 as shown by the chain line G. The cam 48 is also made to repeat opening and closing the switch 49 every one frame of photographing.

Figure 2:
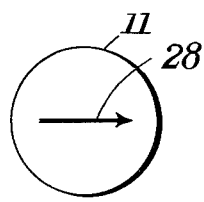
FIGURE 2 is a front view of a fluorescent screen illustrating an electron microscopic image.

Now, when the electron beam 5 is emitted from the electron gun 1 and a specimen 27 is inserted between the converging lens 7 and the objective lens 8 and when proper currents are applied to the respective coils of the converging lenses 6 and 7, the objective lens 8, the intermediate lens 9 and the projector lens 10, the electron beam 5 is refracted by the respective lenses and finally an enlarged microscopic image 28 of the specimen 27 is focused on the fluorescent screen 11 as shown in FIG. 2.

Figure 3:
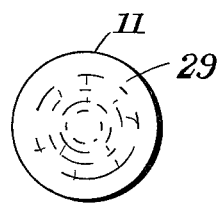
FIGURE 3 is also a front view of a fluorescent screen illustrating an electron diffraction pattern.

As shown in FIG. 1, the switch 22 is closed while switch 23 is opened, then the intermediate lens 9 is energized through a resistor 30 by a comparatively large current so that an enlarged microscopic image of the specimen 27 may be focused on the fluorescent screen 11, when the objective iris 46 is inserted by the switch 49. Next, if the cam 24 is rotated by half and the switches 22 and 49 are opened and the switch 23 is closed in the above mentioned circumstances, the intermediate lens 9 is energized, through a resistor 31, by a lesser amount of a current so that an enlarged diffraction pattern 29 of the specimen 27 may be focused on the fluorescent screen 11, when the objective iris 46 is removed towards the left as shown by the arrow. Thus the diffraction pattern 29 can be obtained on the fluorescent screen 11 as shown in FIG. 3.

As shown in FIG. 1 the switches 22, 49 and 23 are so ganged with one another as to repeat opening and closing every one frame of the film 20, accordingly if the photographing is made repeatedly in such conditions as above explained in connection with FIG. 1, the microscopic image 28 and the diffraction pattern 29 are obtained in succession one after the other by the opening and closing operations of the switches 22, 49 and 23 and photographed on the film 20 alternately as shown in FIG. 5. Transitional changes of the images due to the opening and closing changing-over of the switches 22, 49 and 23 are eliminated by arranging the shutter 13 which is preferably made of a conductive material for taking off electric charge.

FIG. 6 is an arrangement of a projector for projecting the electron microscopic image and the electron diffraction pattern which are photographed alternately on the film 20 to a screen. Light beams from a lamp 33 are converged by condenser lenses 34 and 35 and the image is focused, by a projector lens 38, to a screen 39. If a shutter 36 is provided between the condenser lens 35 and the projector lens 38 and made to revolve in synchronization with the frame transference of the film 20, a photographed image of the film 20 is projected on the screen 39.

In this case, the electron microscopic image 28 and the electron diffraction pattern 29 have been alternately photographed on the film 20, hence mirrors 42 and 43 and a separating shutter 44 are provided so as to separate the two.

The mirror 42 is a semitransparent mirror and the mirror 43 is a single-faced mirror, and they are arranged at the angle of substantially 45° with respect to the axis of the light beam as shown in FIG. 6. The semitransparent mirror 42 which is disposed with the inclination of 45° to the axis of the light beam enables one part of the light beam from the lamp 33 to pass straight forwardly therethough and also reflects the other part in the direction of the mirror 43 at the angle of 90° with respect to the axis.

The incident beam of light onto the mirror 43 is reflected again therefrom to be projected in the direction of the screen 39.

Consequently, on the screen 39 are projected side by side the beam of light which has passed through the semitransparent mirror 42 and the other one reflected by the semitransparent mirror 42 and the single-faced mirror 43.

The separating shutter 44 is of a disc type and provided with a window 45 on one part thereof as shown in FIG. 7, so that when the reflected light beam from, for instance, the mirror 43 is permitted to pass through the window 45 the light beam from the mirror 42 is intercepted. Accordingly, if the revolution of the separating shutter 44 is made to be synchronized with the frame transference of the film 20, on the screen 39 may be projected an enlarged image 40 of the electron microscopic image 28 and an enlarged pattern 41 of the electron diffraction pattern 29 at the same time. Hence the image 40 and the pattern 41 may be observed in the same field. At this time, the electron microscopic image 28 and the electron diffraction pattern 29 are alternately projected and separated from each other in parallel. Besides this projection device, such a projector wherein both the image and the pattern are photographed together in one frame and they are projected on the same screen so as to be observed may easily be made.

According to this invention as above described, an electron microscopic image and an electron diffraction pattern may be observed, being projected alternately. Therefore, this invention is very important from an industrial point of view.

The above description has been made in connection with only one embodiment of this invention, but it will be apparent that many modifications and variations may be effected without departing from the scope of the novel concepts of this invention.

What is claimed is:

1. An electron microscope comprising an electron gun for emitting an electron beam, an electron lens system composed of a converging lens, an objective lens, an intermediate lens and a projector lens which are disposed, stage by stage, along the advance direction of the electron beam, a fluorescent screen arranged in front of said electron lens system, means for energizing said intermediate lens with different energies as an electron microscopic image and diffraction pattern are obtained, and an iris device disposed in front of said objective lens, and means for changing degree of opening said iris device as the electron microscopic image and diffraction pattern are obtained.

2. An electron microscope comprising an electron gun for emitting an electron beam, an electron lens system composed of a converging lens, an objective lens, an intermediate lens and a projector lens which are disposed, stage by stage, along the advance direction of the electron beam, a film photographic apparatus arranged in front of said electron lens system, said film photographic apparatus being provided with a shutter and a film driving device which is disposed in rear of the shutter and transfers a film intermittently frame by frame, an electrical circuit for energizing said intermediate lens, two switches which are ganged with said film driving device so as to be opened and closed reversely to each other as the film is transferred frame by frame, current controllers which are inserted respectively in circuits including said switches and control the conductive current of an electrical circuit of said intermediate lens to different values as an electron microscopic image and diffraction pattern are obtained, and an iris device which is disposed in front of said objective lens and ganged with the driving device so as to change degree of its opening as the electron microscopic image and diffraction pattern are obtained.

3. An electron microscope comprising an electron gun for emitting an electron beam, an electron lens system composed of a converging lens, an objective lens, an intermediate lens and a projector lens which are disposed, stage by stage, along the advance direction of the electron beam, a fluorescent screen arranged in front of said electron lens system, a film photographic apparatus arranged in front of the fluorescent screen, said film photographic apparatus being provided with a shutter and a film driving device which is disposed in rear of the shutter and transfers a film intermittently frame by frame, an electrical circuit for energizing said intermediate lens, means which are ganged with said film driving device for energizing said electrical circuit as an electron microscopic image and diffraction pattern are obtained, an iris device disposed in front of said objective lens, and means which are ganged with said film driving device for controlling said iris device with respect to the path of the electron beam.

4. An electron microscope comprising an electron gun for emitting an electron beam, an electron lens system composed of a converging lens, an objective lens, an intermediate lens and a projector lens which are disposed, stage by stage, along the advance direction of the electron beam, a fluorescent screen arranged in front of said electron lens system, a film photographic apparatus arranged in front of the fluorescent screen, said film photographic apparatus being provided with a shutter and a film driving device which is disposed in rear of the shutter and transfers a film intermittently frame by frame, an electrical circuit energizing said intermediate lens, a cam which is ganged with said film driving device to be rotated, two switches which are operated by said cam so as to be opened and closed as an electron microscopic image and diffraction pattern are obtained, current controllers which are inserted respectively in circuits including said switches and control the conductive current of an electrical circuit of said intermediate lens to different values as the electron microscopic image and diffraction pattern are obtained, an iris device disposed in front of said objective lens, and means which are ganged with said film driving device for controlling said iris device with respect to the path of the electron beam, said device being composed of a cam which is ganged with the aforesaid cam so as to be rotated, and an electro-magnetic operating device which is energized through a contact point controlled by said cam by which said iris device is operated.

References Cited in the file of this patent

UNITED STATES PATENTS

| | | |
|---|---|---|
| 2,627,200 | Huber | Feb. 3, 1953 |
| 2,802,110 | Kazato et al. | Aug. 6, 1957 |
| 2,897,366 | Cochran | July 28, 1959 |
| 2,940,356 | Volkmann | June 14, 1960 |

FOREIGN PATENTS

| | | |
|---|---|---|
| 644,604 | Great Britain | Oct. 11, 1950 |

OTHER REFERENCES

Norelco EM–100B Electron Microscope, by J. Donald Rodgers, Norelco Reporter, vol. V, No. 1, Philips Electronics Inc., San Francisco, Calif.